Sept. 18, 1934.  P. J. DUFFY  1,973,848

FLUSH JOINT DRILL STEM

Filed May 26, 1932

Inventor
PETER J. DUFFY.
Jesse R. Stone.
Lester B. Clark.
Attorneys.

UNITED STATES PATENT OFFICE 1,973,848

FLUSH JOINT DRILL STEM

Peter J. Duffy, Houston, Tex.

Application May 26, 1932, Serial No. 613,630

5 Claims. (Cl. 285—146)

The invention relates to an improvement in the general type of flush joint pipe, particularly that which may be employed in drill stems.

It is an object of the invention to provide a flush joint drill pipe which is adapted to withstand the enormous crushing stresses which are applied to pipe of this type when it is used in the drill stem for drilling wells by the rotary method, wherein it is supported by slips or other members from the rotary table.

Another object of the invention is to provide a section of drill pipe having thickened areas adjacent the ends thereof to withstand crushing stresses.

Another object of the invention is to provide a pipe section which is adapted to be connected to adjacent sections by a compound threaded connection, which includes a straight threaded area and a tapered threaded area.

Another object of the invention is to provide a drill pipe section having a slightly enlarged area adjacent each end thereof for the purpose of preventing slips or other engaging members from sliding beyond the end of the pipe section.

Another object of the invention is to provide a pipe connection which embodies a compound thread including straight threaded areas to be engaged with each other in order to insure sufficient contact areas to permit the transfer of enormous stresses.

Another object of the invention is to provide a compound thread including a straight area which is merged into a tapered area in order to form a sealing thread which will have great strength.

Another object of the invention is to provide a pipe section which is thickened adjacent the ends thereof so that when the pipe is cut away to provide for the threaded connecting areas the remaining section will be at least as strong as the normal cross sectional area of the pipe section.

Other and further objects of the invention will be readily apparent when the following description is considered in connection with the accompanying drawing wherein Fig. 1 is a broken sectional view of a pipe coupling embodying the ends of pipe sections constructed in accordance with one form of the invention.

Figure 2:
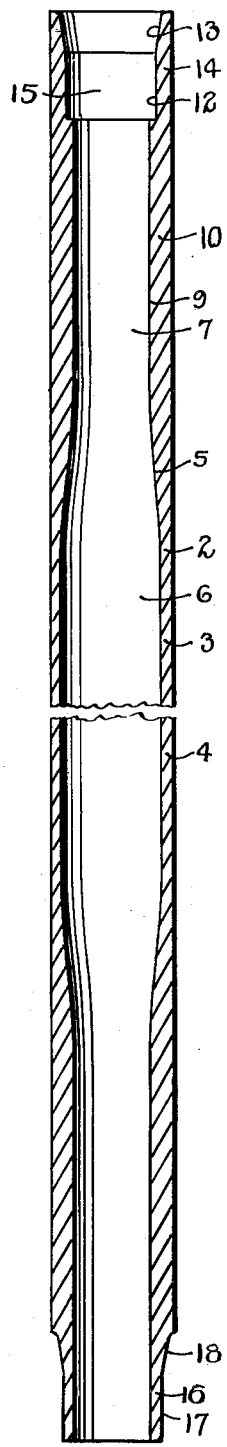
Fig. 2 shows a blank of pipe before being threaded in accordance with the invention.

It is intended that the present invention may be applied to any kind of pipe. It is, however, particularly adapted for application in connection with pipe to be used as drill pipe or in making up the drill stem used in the method of rotary drilling. Fig. 2 shows a blank of pipe which has been made up and which has been partially formed into a pipe section embodying the invention. This blank of pipe is indicated generally at 2 and includes the normal body of the section, which is of a uniform thickness indicated at 3. The pipe section may be of any desired length but as the end of the section is approached the thickness of the wall 4 is increased as at 5 by tapering inwardly so that the passage 6 through the pipe is restricted slightly as at 7.

The tapered portion 5 merges gradually into the normal wall 4 so that there will be no abrupt shoulder and no obstruction to the flow of fluid through the pipe. Beyond the tapered portion 5 the wall is again straight, as at 9, until a joint adjacent the end of the pipe section is reached. This thickened portion of the wall 10 is provided for a particular purpose.

In the drilling of wells the pipe is lowered into and removed from the well in order to accomplish the drilling operation. It is usual to raise and lower the string of pipe by an elevator or other power means, but as the sections of pipe are connected and disconnected it is necessary to suspend the string of pipe that remains in the well from the derrick floor or rotary table. To accomplish this, any well known type of slip may be used. These slips fit in a tapered bowl in the rotary table and are wedged against the outside of the drill pipe to frictionally support the same. Obviously, if there is a great weight of pipe in the well, then the weight to be supported on these slips is enormous and causes a great crushing pressure upon the pipe.

In view of the fact that wells are being drilled to depth of from eight to ten thousand feet, the weights of drill pipe being suspended from the slips is constantly increasing. It is not uncommon to distort the pipe and disfigure the same by supporting it in the slips. The present pipe is therefore thickened, as at 10, to provide sufficient material to withstand the crushing stresses. It is seldom that the pipe is supported at any point except adjacent the end thereof and for this reason the normal body of the pipe as at 3 is not thickened, and the thickened areas are only provided adjacent the ends, as best seen in Fig. 2. The thickened area merges into the normal body of the pipe by gradual curves so that there are no abrupt surfaces to serve as obstructions to the flow of fluid through the pipe.

The thickened portion 10, adjacent the end of the pipe, serves another purpose, viz, when a portion is cut away as at 12 and as at 13, to provide for the threaded connections, the remaining thickness of material, as at 14, will provide a connection of considerable strength and in fact in making up the pipe embodying this invention it is intended that the thickness 14 shall be at least equal to the thickness of the wall 4. In this manner the pipe will not be weakened adjacent its connection with the adjoining section, as is now the case with a majority of pipe sections. In fact, in drilling operations it is usual for the drill pipe to break off at a point adjacent the threaded connection. This is due to the fact that the pipe is rotated and in view of the fact that the joint is, of course, the stiffest portion of the pipe. Any flexure, therefore, in the pipe takes place adjacent the stiffened portion. With the present pipe, however, the thickened portion 10 would eliminate such flexure adjacent the connecting parts and the flexure would occur in the normal body 3 of the pipe, which is of considerable length and would therefore not injure the pipe.

The upper end of the pipe section is arranged to be formed with what is termed the box member 15, while the lower end of the pipe is formed with the pin member 16. Fig. 2 shows the box and the pin member merely formed in blank by milling away the pipe to form portions 12 and 13 in the box member, and the straight portion 17 and tapered portion 18 of the pin member. The pipe section, as seen in Fig. 2, is now ready to be threaded in order to complete its construction.

Figure 3:
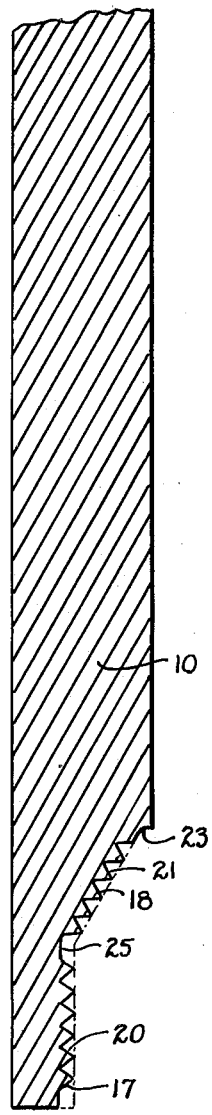
Fig. 3 is a broken detail section showing an enlarged or exaggerated view of the pipe end to illustrate one form of constructing the threaded areas.

Fig. 3 shows one form of threading the pipe end. The thickened wall portion is shown at 10 and the straight section 17 has been provided with the threads 20. These threads may be either V or acme type threads, or they may be any other type of thread desired. It is the intention to thread the portion 17 with a standard type of straight thread. This thread may be varied pitch in accordance with the stresses which it is to be called upon to withstand. The tapered portion 18 is shown as exaggerated in Fig. 3 and is provided with a tapered thread 21. This thread is preferably of the same pitch and type as the thread 20. It is to be understood, however, that a different type thread may be placed on each portion. When the pipe sections are to be coupled together the threads 20 are engaged in the straight threads which will be provided in the corresponding box member of the next pipe section, and the pipe turned so that these threads will move the pipe section together.

Gradually the threads 18 will come in contact with the tapered threads of the box member and when the threads are completely made up the two pipes will be securely fastened together, not only by the tapered threads 18, but additional strength will be provided and the connection assured by the engaging straight threads 20. This particular form of threaded connection is of advantage in drill pipe, particularly because of the enormous weight of a long section of drill pipe. Pipe of this type weigh as much as fifteen pounds per foot and when it is considered that a string of eight or ten thousand feet is to be suspended in the well it is readily understood that the threaded connection are subjected to enormous strain.

Figure 1:
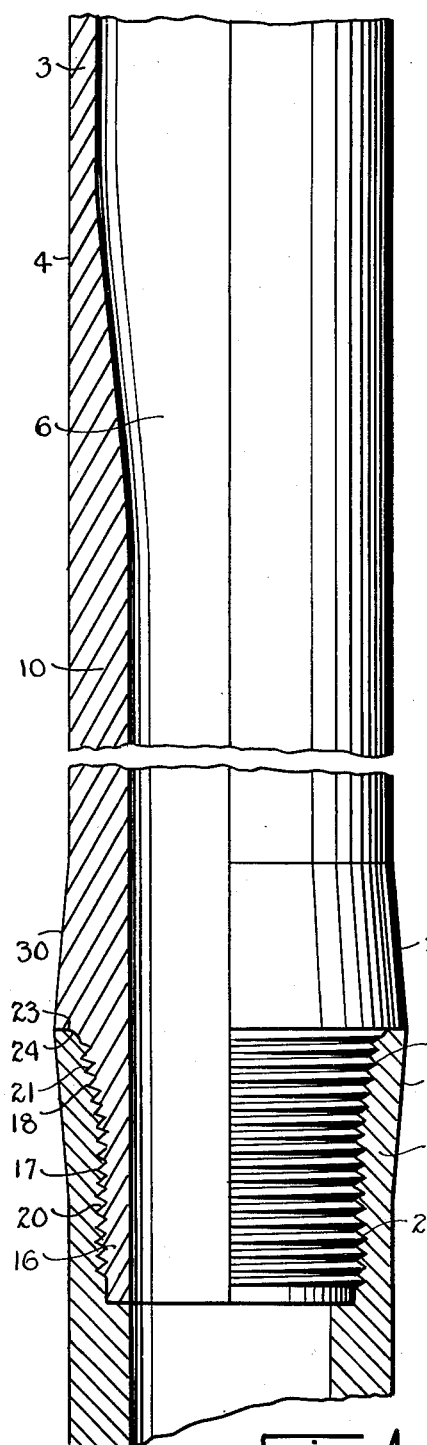

Above the tapered threads 21 is a shoulder 23. This shoulder is indicated as rounded slightly so that no sharp corners will be provided and so that the abutting end of the next adjoining pipe section will fit closely in this rounded shoulder 23. The arrangement of the parts when they are in engagement is best seen in Fig. 1 where the beveled face 24 of the box member end of the pipe fits into the shoulder 23 to complete the seal in combination with the threads 20 and 21. It is understood that fluid under enormous pressure is pumped through the drill stem to maintain the circulation in the well bore and that a complete seal must be made at each pipe connection.

The present pipe sections are provided with strong portions so that the pipe string will have great axial strength and can be made up in great lengths.

In the arrangement of the threads in Fig. 3 a thread has been omitted as at 20 between the straight threads 20 and the tapered threads 21. This arrangement may or may not be followed. It is intended that the thread is dispensed with for the purpose of assisting in making the threaded connection and allowing a certain amount of play between the threading of the straight and the tapered portion. Fig. 1, however, shows the invention without the space 25 and it is intended that either form construction may be used.

Fig. 1 shows an enlarged broken sectional view of the connecting ends of the pipe. This construction is the same as that previously described insofar as the threading of the parts is concerned. This form of the invention is also the same as that previously described relative to the thickened portion 10. There is a distinction, however, in that the straight outside surface of the pipe body has been interrupted by the slightly tapered areas 30 and 31, which are on the pin and box member ends of the pipe, respectively. These tapered areas are provided adjacent the end to make a slight enlargement which will provide a place of support or engagement for the elevators or slips used in handling the pipe. It is to be understood that in handling flush joint drill pipe about a well elevators fitted with slips are used and that slips are used in supporting the pipe in the rotary table.

While slips of this type are in general use and are used to support flush joint drill pipe the additional safeguard of the tapered areas 30 and 31 has been provided so that in event the pipe should slide in the slips the same would not entirely escape from the slips but would be again gripped when the tapered faces 30 and 31 moved in between the engaging slips. It is contemplated that the enlarged tapered faces 30 and 31 may or may not be provided. The blank of Fig. 2 and the enlarged section of Fig. 3 show the pipe without this external taper. It is not intended that this taper shall be so great as to interfere with the manipulation of the flush joint pipe through a stuffing box or other sealing element on the well head.

A drill stem made up with pipe sections constructed in accordance with the invention will have a materially longer life than those now in general use, because of the long main body portion which is made up of the thickest wall section, the stiffer portions of the pipe being at the ends. This construction permits a gradual flexure or curvature of each pipe section when it is in use. There will be no sharp points or curvature or deviation from the general axial direction of the drill stem at the couplings as now occurs where the weakest portion of the pipe is at the connection. It is therefore apparent that any stresses in the drill stem will be uniformly distributed in each pipe section and the curvature will be very gradual.

It is to be understood that the pipe of the present invention is particularly adapted for use as drill pipe. It is also capable of use wherever the pipe is subjected to great pressures and where considerable strength is required. One such instance is in the piping in refineries where considerable pressure is applied. The arrangement of the present pipe by the omission of the collars avoids blowing the drill stem from the hole in event the well blows out because there are no collars against which the pressure can be exerted.

The smooth outside surface of the pipe does not afford any material resistance to the passage of material and is therefore not subjected to the cutting action of abrasives circulated in the well.

There are no threads exposed either on the inside or the outside of the pipe string when it is made up and when the pipe sections are uncoupled only the threads on the pin member are exposed. The pipe has great axial strength due to the thickened portions at the joints and to the additional straight thread as well as the tapered threaded areas.

While a simple form of the invention has been here described it is to be understood that the same may be embodied in various constructions without departing from the appended claims.

What I claim as new is:

1. A drill pipe section including a pipe of uniform external diameter, a thickened portion adjacent each end of said pipe wherein the thickness of the material is at least twice the normal pipe thickness, and a threaded pin connection formed on one end of said pipe wherein the inner diameter of the pipe is not materially increased and the thickness of the material in the pin is at least that of the normal pipe section, said pin connection including a tapered threaded portion and a straight threaded portion at the extremity of said section extending from said tapered portion both said tapered and straight threaded portions being engageable within a single socket, and a socket upon the opposite end of said pipe.

2. A threaded connection for flush joint drill stem including a rounded shoulder merging with the outer circumference of the pipe, a tapered threaded portion merging with said shoulder, and a straight threaded portion beyond the small end of said tapered portion, the thickness of the wall of the said stem at the joint being upset to only slightly decrease the inner diameter of said pipe.

3. A drill pipe section including a pipe of uniform external diameter except for a slight increase in outer diameter at its ends, a thickened portion adjacent each end of said pipe wherein the thickness of the wall of said pipe is at least twice the normal pipe thickness, a box at one end of said section, and a threaded pin connection formed on one end of said pipe wherein the thickness of the material in the pin is at least that of the normal pipe section, said threaded pin having a tapered area and a cylindrical area beyond said tapered area at the extremity of said pipe.

4. A pipe section including a body having a wall of uniform thickness, a thickened wall area of slightly larger outer diameter merging into said body at each end thereof, a pin member on one of said thickened ends and a box member on the other end, said pin member having a tapered threaded area and a cylindrical threaded area, at the outer end of said tapered area, with a blank area between them.

5. A tubular section having a cylindrical exterior except for a smooth outward flare toward the ends thereof free of projections or shoulders, the wall of said section being increased in thickness on its inner surface gradually toward said ends, whereby the ends of said section are reenforced for strength, a flaring threaded box on one end of said pipe and a tapered threaded pin on the other end thereof.

PETER J. DUFFY.